(12) United States Patent
Nipp

(10) Patent No.: US 6,373,244 B1
(45) Date of Patent: Apr. 16, 2002

(54) APPARATUS FOR MARKING A SURFACE INDICATING ELEMENTS LOCATED INWARDLY OF THE SURFACE

(75) Inventor: Hansjörg Nipp, Fürstentum (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/296,085

(22) Filed: Apr. 21, 1999

(30) Foreign Application Priority Data

Apr. 22, 1998 (DE) .......................................... 198 17 953

(51) Int. Cl.⁷ .......................... G01N 27/72; G01R 33/12
(52) U.S. Cl. ....................... 324/235; 324/262; 324/242; 324/326; 324/67
(58) Field of Search ............................ 324/67, 66, 226, 324/235, 326, 242, 262

(56) References Cited

U.S. PATENT DOCUMENTS

| | | | | |
|---|---|---|---|---|
| 3,614,604 A | * | 10/1971 | Reinshagen | 324/216 |
| 4,041,379 A | * | 8/1977 | Karlsson | 324/260 |
| 5,296,807 A | * | 3/1994 | Kousek et al. | 324/235 |
| 5,517,114 A | * | 5/1996 | Reitz et al. | 324/262 |
| 5,619,136 A | * | 4/1997 | Drury | 324/242 |
| 6,119,526 A | * | 9/2000 | Reigstad et al. | 73/803 |

\* cited by examiner

*Primary Examiner*—Jay Patidar
(74) *Attorney, Agent, or Firm*—Sidley Austin Brown & Wood, LLP

(57) ABSTRACT

An apparatus for locating positions on a surface of a structural member indicating the presence of elements within and below the surface of the structural member by means of a detector (1) including a scanning head (3), a position measuring device (4) and an evaluation unit (5) all located within a housing (2). A marking device (6) is connected to and interacts with the evaluation unit (5) for automatically placing a visible marking on the surface of the structural member at the location of the elements scanned by the detector.

11 Claims, 3 Drawing Sheets

APPARATUS FOR MARKING A SURFACE INDICATING ELEMENTS LOCATED INWARDLY OF THE SURFACE

BACKGROUND OF THE INVENTION

An apparatus for locating positions on a surface of a structural member indicating the presence of elements within and below the surface includes a detector located in a housing and movable over the surface of the structural member. The detector has a scanning head mounted in the housing and a position measuring device within the housing for locating on the surface of the structural member a position of an element within the member and below its surface. An evaluation unit is located in the housing.

If a hole is drilled or a fastening member driven, for example, a nail or similar device, at a particular location into a structure, it is often necessary to ascertain if anything is present below the surface. For example, damage to electrical lines or to pipes carrying liquid within the structure can be avoided by such procedure. In the case of reinforced concrete structural members, it is important to know where the reinforcement is located and the direction in which it extends, so that, for example, drilling can be carried out at intended locations and not blocked by the reinforcement. Devices are known in the art for such a purpose. Utilizing known physical effects, such devices enable the interior of a structural member to be investigated. Such a device is disclosed in U.S. Pat. No. 5,296,807. With this device, magnetizable materials can be located within the structural member. In addition to devices for locating predominantly metallic elements, other devices are known, using ultrasonic waves or radar radiation for locating non-metallic elements within the structural member.

To find elements located within the structural member, the surface of the member is scanned with a point probe or scanning device such as the device disclosed in U.S. Pat. No. 5,296,807. When point probes are used, the location on the surface is determined and then a marking is affixed by hand with a pencil or a punch. In the scanning device of U.S. Pat. No. 5,296,807 a reinforcing member detected below the surface is displayed on a screen. The position of the screen is assigned to the effective location on the structural member surface by means of a measuring grid and a marking is placed by hand at the corresponding location. Manually marking the surface is laborious and subject to possible error. There are measurement probes having an opening through which a marking pencil can be inserted, provided at or in the housing. Because the pencil is guided manually and due to reading inaccuracies, the placement of a marking through an opening can lead to deviations from the correct location. When a measuring grid is used, the accuracy frequently depends on the care of the user when transferring the locations found.

SUMMARY OF THE INVENTION

Therefore, the primary object of the present invention is to avoid the disadvantages in the apparatus known in the art. Systematic random errors when locating elements within a structure or a structural member can be avoided. In accordance with the present invention, the apparatus includes a marking device for automatically placing a visible marking on the surface of the structural member indicating the location of an element scanned by the detector. The apparatus in the present invention for indicating locations on the surface of the structural member within which an element is positioned are found with the help of detection equipment including a scanning head, a position measuring device and an evaluating unit positioned in a housing. The evaluating unit is connected with a marking device interacting with the evaluating unit whereby a visible marking can be placed automatically on the surface of the structural member at the location of the elements detected in the scanning operation.

The marking device of the present invention can be activated or operated automatically at the location of the element, such as the reinforcing member located below the surface of the structural member. The marking can be placed on the surface of the structural member or on a sheet of paper positioned on the surface. There is no longer an offset between the location of the elements scanned and the location marked, since the marking device can be activated only at the effective location. For this purpose, the evaluating unit of the detector equipped with a memory device containing the location data is supplied by the position measuring equipment along with the information concerning the elements found below the surface of the structural member stored in the evaluating unit. The location data and other information, contained in the memory, can be used at a later time for controlling a separate marking device equipped with a position measuring device identical to the detector. The location data, measured by the position measuring device of the marking device, are compared constantly with those of the position measuring device of the detector. As soon as there is agreement, the marking device is activated automatically for producing a visible marking.

In a preferred embodiment of the invention, the detector and the marking device are combined into an apparatus unit which is moved at the same time over the surface of the structural member. Based on the intended direction of movement, the marking device is positioned at a defined distance behind the scanning head and, after the unit has moved by the distance between the scanning head and the marking device, the marking device is activated automatically at the location of the element below the surface of the structural member as scanned by the detector. Such a unit has the advantage that only a single measuring device is required. Possible deviations resulting from different location measuring devices of the detector and of the marking device are reliably avoided in this manner.

The marking device may include a punch-like plunger producing depressions at the desired locations on the surface of the structural member. Preferably, the locations of the elements scanned below the surface are marked in a contactless manner. Accordingly, the marking device includes at least one container for a marking liquid, an applicator with at least one applicator nozzle, and a triggering device.

The marking device may comprise one or more applicator nozzles which can be moved transversely to the direction of movement of the apparatus in accordance with control information collected by one or more sensors disposed in the scanning heads. In an alternate embodiment of the invention, the applicator nozzles are rotatably mounted on a planar paralleled surface of the structural member. To apply a visible marking, the angle of rotation of the applicator nozzle or nozzles can be adjusted as a function of the control information supplied by the one or more sensors disposed in the scanning heads.

Actually, a single applicator nozzle would be sufficient for marking the surface. It has proven, however, to be advantageous to arrange several applicator nozzles in cellular form perpendicular to the intended direction of movement of the apparatus. In an advantageous embodiment of the invention, the number of applicator nozzles corresponds to the number of sensors in the scanning head. With the applicator nozzles arranged in cellular form, they cover a greater region perpendicular to the direction of movement of the apparatus. When the number of sensors and the number of applicator nozzles is the same, an applicator nozzle assigned to each sensor can be triggered separately. A larger area of the surface can be examined in a shorter time period when the apparatus is arranged in this manner. The orientation of the elements positioned below the surface at an angle to the direction of movement can be checked and indicated accurately. Elements extending parallel to the direction of movement of the apparatus are generally detected by at least one of the sensors and can be indicated by the applicator nozzles that follow. Since a surface is generally investigated in a grid-like fashion with the scanning movements extending perpendicularly to one another, the elements positioned below the surface are located in every case independently of their extent relative to the surface of movement of the apparatus and their presence is not represented by visible markings on the surface.

With the sensors arranged replaceably in the scanning head, the apparatus can be changed over for different scanning operations. The scanning head, instead of being equipped with magnet sensors for finding magnetizable elements in a structural member it can also be equipped with ultrasonic sensors or with a radar sending and receiving device, for detecting non-metallic elements.

Since a separate container for the marking liquid is connected to each applicator nozzle, different types of visual markings can be applied, for instance, certain additional information, such as information concerning the character of the element located below the surface, can be provided in a coded form by different colors. In this way, it is possible to tell whether it is a reinforcing member, an electrical line or a water pipe.

In an advantageous embodiment of the claimed invention, the marking device is arranged on one hand for visibly marking the location of a detected element, and, on the other hand, for reproducing additional information, such as the depth at which the element has been observed. This can be accomplished due to the fact that the applicator nozzles are triggered in such a manner that the marking device gives the orientation of the element found below the surface, and, in addition, is in a position to draw numerals, letters, symbols, color markings and the like on the surface.

It is advisable to connect the evaluating unit with an input unit, such as an alphanumeric input field for the input of threshold values and the like. With such an arrangement, the marking device can be triggered in such a manner that a marking is produced only if the distance between an element located and the surface is less than a specified threshold value. It is proven to be advantageous to place the marking device in a separate housing detachably connected with the detector housing. Further, the marking device can have its own power supply. Advantageously, however, the power is supplied by the power supply of the detector. Further, the connection required is provided by appropriate coupling over connection interfaces at the housing of the detector and at the marking device. By separating the two devices within the housing the detector can be used independently of the marking device. The user also has the option of initially acquiring only the detector. Later, when he finds that he would also like to use the advantages of the marking device, there is the possibility of supplementing the existing detector device to gain an advantageous complete system.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

Figure 1:
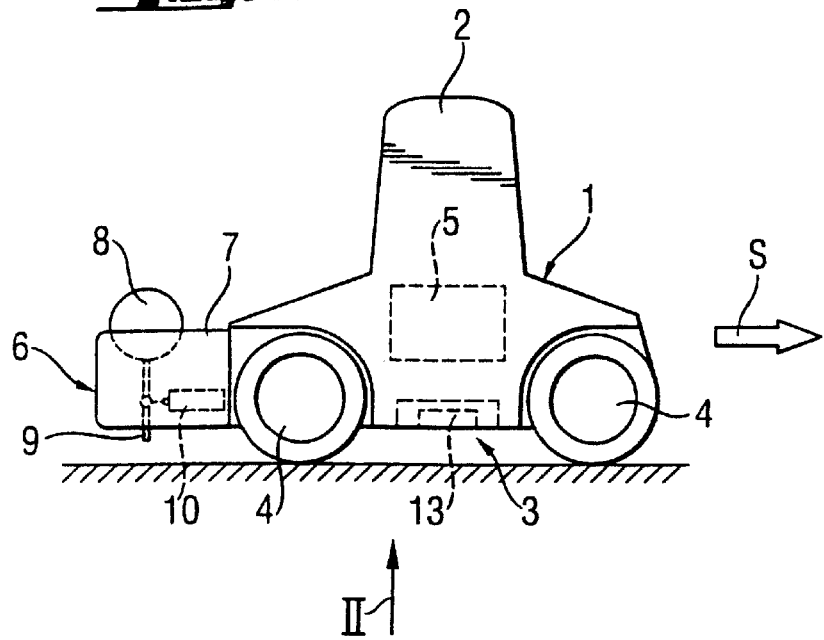
FIG. 1 is a diagrammatic illustration of an apparatus embodying the present invention.

DETAILED DESCRIPTION OF THE INVENTION:

The apparatus, illustrated in FIG. 1, comprises a detector 1 located in a housing 2. The detector 1 is a device for locating magnetizable materials in structural members, as described in U.S. Pat. No. 5,296,807 which detector is an essential integral component of the present application. The detector 1 contains a scanning head including a permanent magnet for introducing the magnetic field into the structural member and includes two field plates disposed next to one another on only one pole surface of the permanent magnet and connected to one another in a differential circuit for measuring the magnetic field of the permanent magnet disturbed by the magnetizable material. The differential data, supplied to the respective positions of the field plate pairs, provide a differential data signal from which, after differentiation, conclusions can be drawn concerning the location and, in particular, the depth of the magnetizable material below the surface of the structural member. The relative position of the magnetizable material within the structural member can then be imaged, for example, on a display provided on a device. The permanent magnet on the field plates, connected with one another in the differential circuit, form a sensor 13 which is accommodated replaceably in the scanning head 3.

The data collected in the scanning operation is evaluated in an evaluation unit 5 including memory and computing components, such as a microprocessor. The position on the surface of the structural member determined with the aid of a position measuring device, comprises for example, wheels the rotation of which are recorded. From the circumference of the wheels of the measuring device 4 or of the axles and the number of rotations recorded, the distance moved from a reference location, is determined in the evaluation unit.

A significant feature of the invention is the connection of the detector 1 with a marking device 6. The marking device 6 is positioned in a separate housing 7 and includes at least one container 8 for a marking liquid and at least one applicator nozzle 9 which can be actuated via a valve 10. Relative to the intended direction of movement of the apparatus, indicated by the arrow S, the applicator nozzle 9 is spaced at a defined distance trailing the scanning head 3. This distance is stored in the evaluating unit 5. The marking device is activated based on the information collected regarding an element detected by the scanning head 3 at a position below the surface of the structural member, when the apparatus has been moved by the distance between the scanning head 3 and the applicator nozzle 9. The distance covered is checked by the position measuring device 4 of the detector 1. Based on the illustrated embodiment of the invention, the detector 1 and the marking device, are located in separate housings 2 and 7 respectively. It is self-evident that the components of the apparatus could also be disposed within a common housing.

Figure 2:
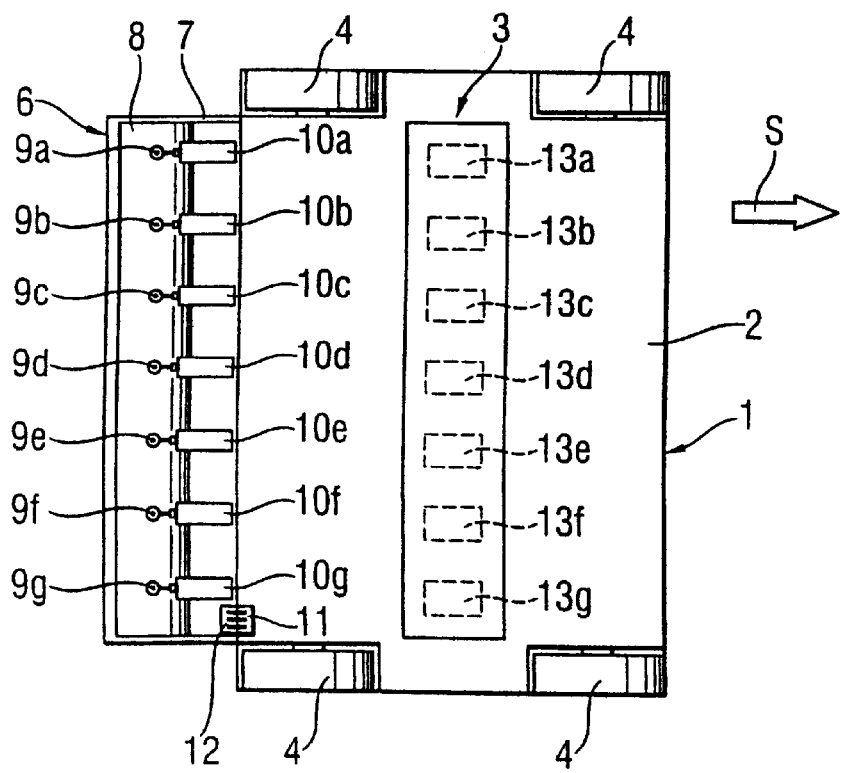
FIG. 2 is a diagrammatic view of the apparatus in FIG. 1, viewed in the direction of the arrow II in FIG. 1, and partially in section.

FIG. 2 illustrates the apparatus in a diagrammatic view from below taken in the direction of the arrow II in FIG. 1. The detector 1 and the marking device 6 are detachably connected over connecting interfaces 11, 12 each with its own housing 2, 7, respectively. Contacts at the connecting interfaces 11, 12, not described in detail, ensure a proper connection of the valves 10a to 10g for the applicator nozzles 9a to 9g disposed in the housing 7 of the marking device and the evaluation unit is not shown. In addition, contacts providing power supply between the detector 1 and the marking unit 6 are provided at the connecting interfaces 11, 12. While a separate energy source for actuating the valves 10a to 10g may be provided in the housing 7 of the marking device 6, the source of energy, the details of which are not shown, is located in the housing 2 of the detector 1 for this purpose. Usually batteries or accumulators function as the power source.

As is evident in FIG. 2, the number of applicator nozzles 9a to 9g corresponds to the number of sensors 13a to 13g replaceably arranged in the scanning head. In this connection, one applicator nozzle 9a to 9g is assigned to each sensor 13a to 13g. The applicator nozzles 9a to 9g are arranged so that the nozzles are located in a linear extension, parallel to the direction of movement S of the apparatus, behind the associated sensors 13a to 13g. The linear course of the direction of movement S of the apparatus is fixed by the arrangement in alignment of the wheels of the position measuring device 4. The applicator nozzle 9a to 9g may be connected with a single container for marking liquid. In an advantageous embodiment of the invention, a separate container for marking liquid is provided for each applicator nozzle 9a to 9g, this is not shown in FIG. 2.

Figure 2A:
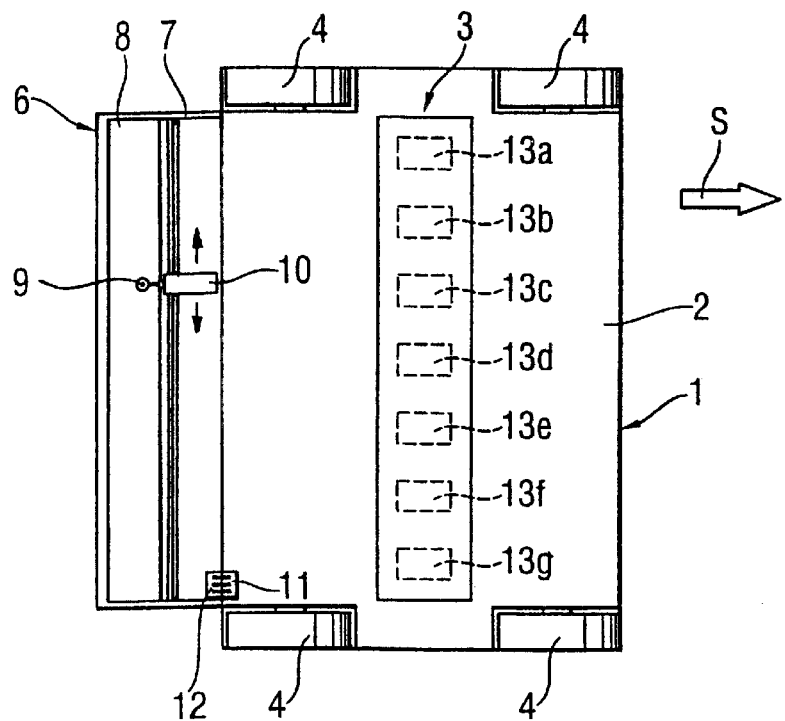
FIG. 2a is a diagrammatic view, similar to FIG. 2, illustrating movement of a part of the apparatus transverse to the intended direction of movement.

In FIG. 2a it is shown that at least one applicator nozzle 9 is movable transversely to the direction of movement 5 of the housing 2 in accordance with control information supplied by a corresponding sensor 13 in the scanning head 3.

Figure 2B:
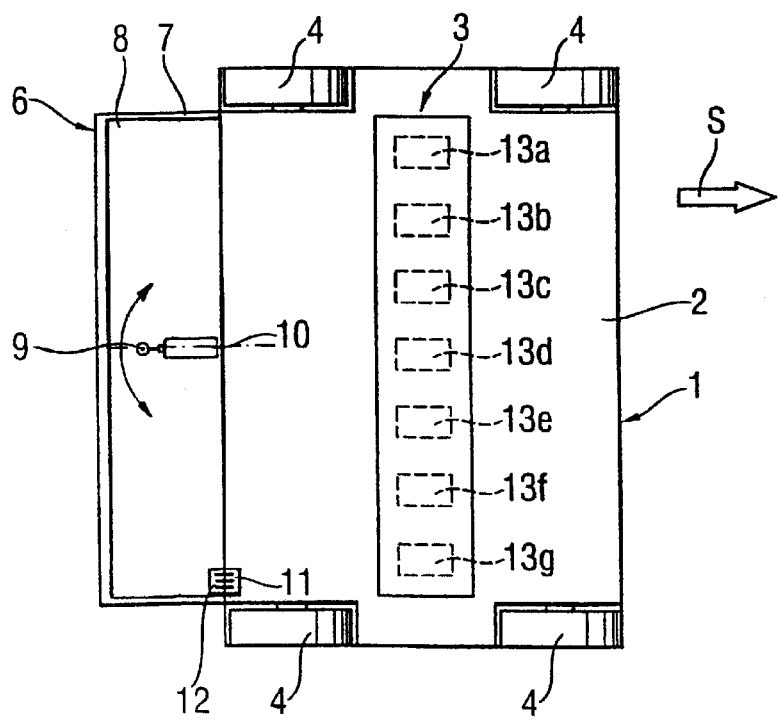
FIG. 2b is a diagrammatic view, similar to FIG. 2, illustrating rotational movement of a part of the apparatus relating to the intended direction of movement.

In FIG. 2b it is shown that at least one application nozzle 9 is rotatably mounted in a plane parallel to the surface of the structure member and has an angle of rotation adjustable as function of the control information supplied by the corresponding at least one sensor 13 arranged in the scanning head.

Figure 3:
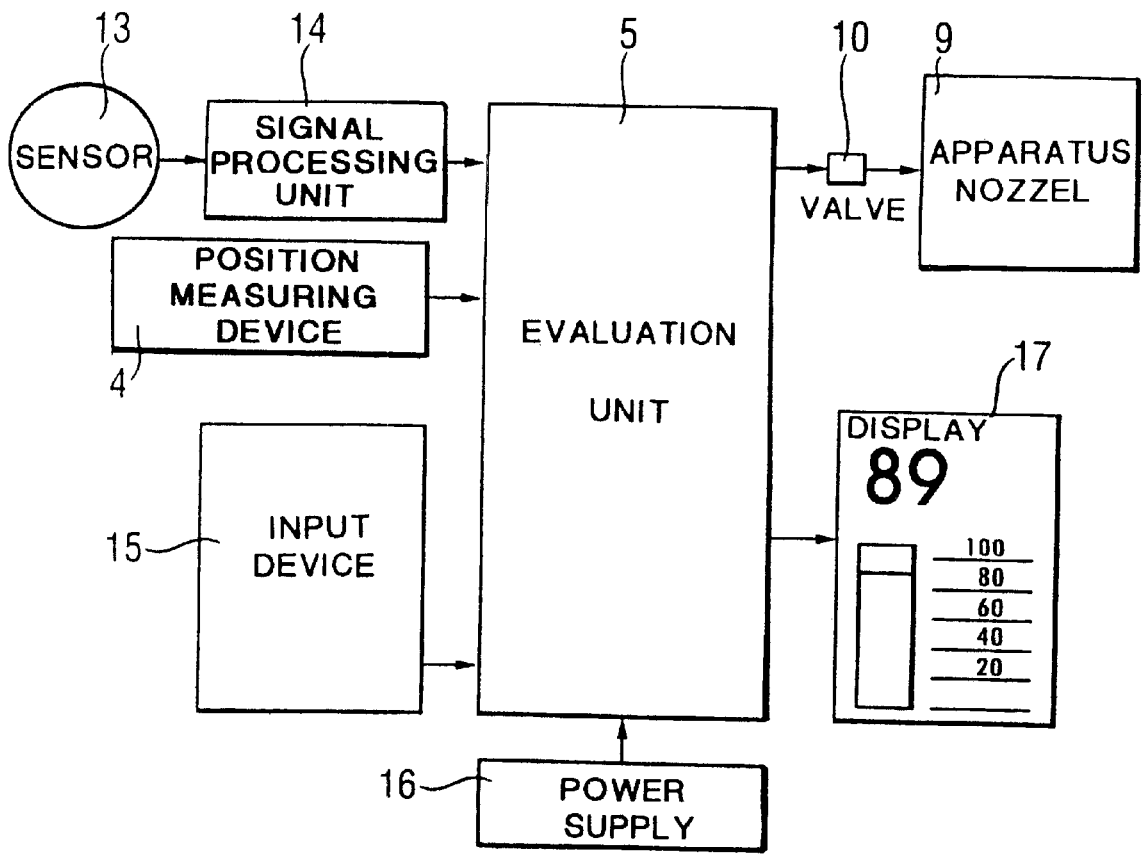
FIG. 3 is a diagrammatic block view of the apparatus embodying the present invention.

FIG. 3 is a block diagrammatic view displaying the components of the apparatus of the present invention connected to one another. Components forming the detector 1 are comprised of one or more sensors 13 disposed in the scanning head. Signals from the sensor 13 are amplified, digitized, and placed into a suitable form for the subsequent evaluation unit 5 in a signal processing unit 14. The evaluation unit 5 includes memory units, computer units, such as a microprocessor and the like. The signals coming from the position measuring device are also processed appropriately and supplied to the evaluation unit 5. The evaluation unit 5 is connected with a power supply 16 formed, for example, by a number of batteries or accumulators. The power supply 16 supplies the energy required for the evaluation unit and the connected devices. The input device 15 comprises a keyboard for the input of parameters relevant for controlling the sensors and for evaluating the measured signals by means of the evaluation unit 5. As an example, threshold values for the depth, at which an element is found, are important values for determining the diameter of the elements to be indicated, information concerning the nature of the elements being scanned can be entered by way of the input unit 15. The data and information entered is checked in a display 17 connected to the output of the evaluation unit 5. The display 17 provides information concerning the elements detected by the sensors 13 below the surface of the structural member and processed in the evaluation unit 5. For example, the orientation and depth of the elements is provided. The evaluation unit is also connected with one or more of the valves 10 by which the applicator nozzles 9 of the marking device 6 can be triggered for dispensing a marking liquid present in one or more of the containers. The marking device is, for example, an ink jet printer, with the ink dispensed according to the piezo or bubble jet principle. Corresponding to the data, which is supplied by the sensors 13 and can be analyzed and processed in the evaluation unit according to the requisite criteria, which can be provided by the user, the valves 10 can be controlled over the evaluation unit 5 so that a visible marking can be produced at the location of an element scanned below the surface of the structural member. The marking can be made in one or more colors, it can be formed as a point, as a line, in shades of gray, with different widths, and the like. The marking can also contain alphanumeric signs and symbols. For example, the marking can reproduce in part or completely the information indicated by the display unit 17.

While specific embodiments of the invention have been shown and described in detail to illustrate the inventive principles, it will be understood that the invention may be embodied otherwise without departing from such principles.

I claim:

1. An apparatus for locating positions on a surface of a structural member indicating the presence of elements in the form of steel reinforcement, water pipes and electrical lines within and below the surface of the structural member, comprising a housing (2) movable in a linear direction of movement (S) over the surface of the structural member, a detector (1) located within said housing (2), said detector includes a scanning head (3) mounted in said housing above the surface of the structural member surface for detecting elements within and below the surface of the structural member, a position measuring device (4) within said housing for locating on the surface of the structural member the position of an element within the structural member spaced below the surface after said housing has traversed a predetermined distance, an evaluation unit (5) including memory and computing components disposed in said housing for collecting data from said scanning head (3), said position measuring device arranged in communication with said evaluation unit, a marking device (6) connected to and interacting with said evaluation unit (5) for automatically placing a visible marking on the surface of the structural member displaying the location of the element scanned by said detector (1) when the predetermined distance has been traversed by said housing, said marking device (6) spaced rearwardly by the predetermined distance in the direction of movement (S) from said scanning head (3), and placing the visible marking on the surface when the housing (2) has moved the predetermined distance.

2. An apparatus, as set forth in claim 1, wherein said marking device (6) comprises at least one container (8) for a marking liquid, and an applicator unit for dispensing the marking liquid comprising at least one applicator nozzle (9) and a triggering device (10) for operating the applicator nozzle based on information stored in the evaluating unit (5).

3. An apparatus, as set forth in claim 2, wherein a plurality of applicator nozzles (9a to 9g) are disposed in cellular form extending perpendicularly to the direction of movement (S) of the apparatus.

4. An apparatus, as set forth in claim 3, wherein the number of applicator nozzles (9a to 9g) corresponds to a number of sensors (13a to 13g) in the scanning head (3) and each of said applicator nozzles is assigned to a corresponding one of said sensors and each said applicator nozzle is triggered by a separate said triggering device.

5. An apparatus, as set forth in claim 3, wherein one said container (8) for the marking liquid is connected to each said applicator nozzle.

6. An apparatus, as set forth in claim 2, wherein said at least one applicator nozzle (9) is movable transversely to the direction of movement (S) of said housing in accordance with control information supplied by said corresponding sensor (13) disposed in said scanning head (3).

7. An apparatus, as set forth in claim 2, wherein said at least one applicator nozzle (9) is rotatably mounted in a plane parallel to the surface of the structural member and has an angle of rotation adjustable as a function of the control information supplied by the corresponding said at least one sensor (13) arranged in the scanning head (3).

8. An apparatus, as set forth in claim 1, wherein said scanning head (3) comprises at least one sensor, and said at least one sensor is replaceably positioned in said scanning head (3).

9. An apparatus, as set forth in claim 1, wherein said marking device (6) in addition to visibly marking the location of a scanned element based on the connection to the evaluation unit (5) is arranged for indicating additional information such as the depth of the elements scanned.

10. An apparatus, as set forth in claim 1, wherein an input device (15) is connected to said evaluation unit (5) for the input of parameters relevant for controlling the sensor and for evaluating the measured signals by means of the evaluation unit (5).

11. An apparatus, as set forth in claim 1, wherein said marking device is located in a housing (7) separate from said housing (2) and said housing (7) is detachably connected with said housing (2) of said detector (1) and each of said detector and marking device (1, 6) having an interface (11, 12) whereby said detector and marking device are coupled for the transfer of signals and power.

* * * * *